July 12, 1949.    A. D. TRENOR    2,475,863
CONTROL SYSTEM
Filed Oct. 4, 1946    2 Sheets-Sheet 1
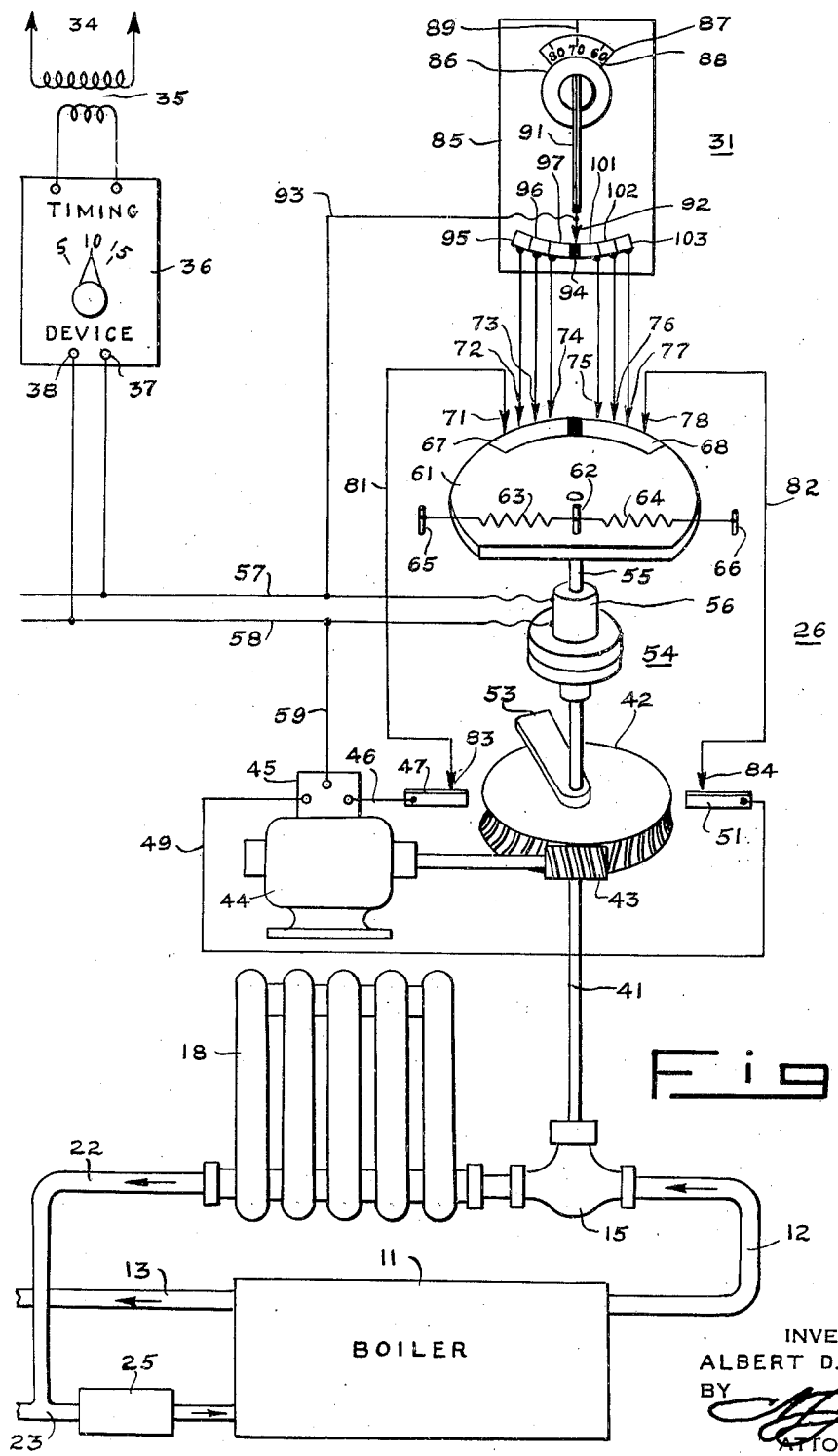
Fig. 1.
INVENTOR
ALBERT D. TRENOR.
BY
ATTORNEY

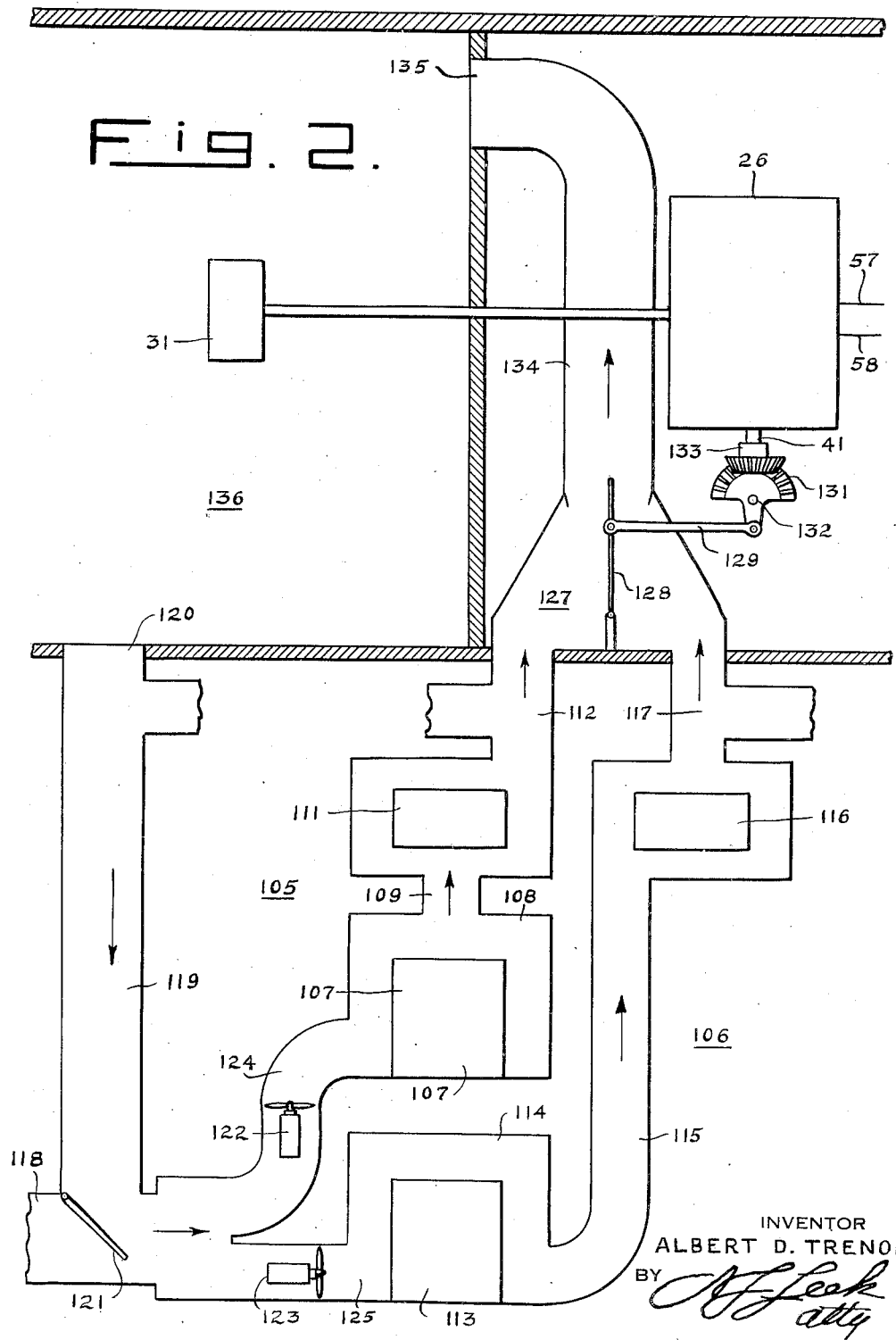

Patented July 12, 1949

2,475,863

UNITED STATES PATENT OFFICE 2,475,863

CONTROL SYSTEM

Albert D. Trenor, Gloucester, Mass., assignor to
John Hays Hammond, Jr., Gloucester, Mass.

Application October 4, 1946, Serial No. 701,158

1 Claim. (Cl. 236—76)

This invention relates to condition control systems and more particularly to an improved system for automatically maintaining the temperature of a room at a predetermined level.

The invention further provides means for varying the amount of heat or cooling supplied to a room in proportion to the variations of the temperature of the room from a predetermined standard.

The invention also consists in certain new and original features of contruction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 illustrates diagrammatically the invention as applied to a hot water heating system, and Fig. 2 is a modified form of the invention as applied to a warm and cold air ventilating and air conditioning system.

Like reference characters denote the parts in the several figures of the drawing.

In the following description parts will be identified by specific names for convenience, but they are intended to be as generic in their application to similar parts as the art will permit.

Referring to the embodiment of the invention shown in Fig. 1, an oil fired hot water boiler 11, of standard and well known construction preferably is provided with aquastatic control adapted to maintain the water in the boiler 11 at a uniform temperature. The boiler 11 is connected by feed pipe 12, to a control valve 15, which in turn is connected to a radiator 18. The radiator 18, is connected by a return pipe 22, and return line 23 to a circulator 25 which in turn is connected to the boiler 11. Feed pipe 13 leads to other radiators which are individually controlled in the same manner as radiator 18. A single control unit is shown herein for purposes of illustration. It is to be understood that this unit is repeated for each radiator.

The valve 15 is operated by a control mechanism 26 which in turn is controlled by a thermostat 31. Power for operating the control mechanism 26 is supplied from a source 34 such for example as a 110 volt A. C. line. The power source 34 is connected thru a step-down transformer 35 to a timing device 36, of any well known and standard construction, which is adapted to supply low voltage power to output terminals 37 and 38 at predetermined selected time intervals and for a predetermined length of time, i. e. for 30 seconds every 10 minutes.

The control mechanism 26 comprises a valve shaft 41 which controls the opening and closing of the valve 15. Secured to the valve shaft 41 is a worm wheel 42 which meshes with a worm 43 mounted on the shaft of a reversible motor 44, the rotation of which is controlled by a suitable reversing mechanism 45.

One side of the reversing mechanism 45 is connected by a lead 46 to a movable contact arm 47. The other side of the reversing mechanism 45 is connected by a lead 49 to a movable contact arm 51.

Secured to the shaft 41 is an arm of insulating material 53 which at suitable times engages the movable contact arms 47 and 51. Also secured to the shaft 41 is one disc of a magnetic clutch 54 the other disc of which is mounted on a shaft 55 which is coaxial with the shaft 41. The magnetic clutch is controlled by a coil 56 which is connected by leads 57 and 58 to the output terminals 37 and 38 of the timing device 36. The lead 58 is connected by a lead 59 to the common return line of the reversing mechanism 45.

Secured to the shaft 55 is a disc 61 of insulating material on which is mounted a pin 62 to which are secured the ends of tension springs 63 and 64 the other ends of which are fastened to anchor pins 65 and 66 respectively. The springs 63 and 64 tend to maintain the disc 61 in a central position when the magnetic clutch 54 is disengaged.

Mounted on the disc 61 are two conducting segments 67 and 68. The segment 67 is normally engaged by four brushes 71—74 and the segment 68 is normally engaged by four brushes 75—78. The brushes 71 and 78 are connected by leads 81 and 82 respectively to fixed contacts 83 and 84 which normally engage the movable contact arms 47 and 51 respectively.

The thermostat 31 comprises a base 85 on which is rotatably mounted a disc 86 which carries a dial segment 87 on which is engraved a temperature scale 88 which in turn registers with a reference mark 89. Mounted on the disc 86 is a thermostatic element 91 of standard bi-metallic construction. Mounted on but insulated from the thermostatic element 91 is a contact 92 which is connected by a flexible lead 93 to the lead 51.

Normally the contact 92 rests on a segment of insulation 94. On each side of the insulation 94 are three conducting segments 95—97 and 101—103. The three segments 95—97 are connected to the three brushes 72—74 respectively and the three segments 101—103 are connected to the three brushes 75—77 respectively.

Operation of Fig. 1

The mechanism is shown in Fig. 1 as in full operation with hot water from the boiler 11 being circulated thru the radiator 18 by the circulator 25. The control valve 15 is assumed to be open the proper amount to allow sufficient hot water to pass thru the radiator 18 to maintain the temperature of the room in which the radiator is mounted at 70° F. At the end of every ten minutes the timing device 36 will cause the circuit 57—58 to be energized. This will cause the magnetic clutch 54 to be engaged due to the energization of the coil 56. If the contact 92 is on the insulation 94 as shown the motor 44 will not be energized and the valve 15 will remain unchanged.

If, during the next interval of the timer, the temperature of the room in which the radiator 18 is mounted should drop to say 69° F. the bi-metallic element 91 will be flexed to cause the contact 92 to engage the segment 97. When the timing device 36 again energizes the circuit 57—58 the clutch 54 will be engaged and a circuit will be closed from the contact 92, segment 97, brush 74, segment 67, brush 71, lead 81, contact 83, movable contact 47 and lead 46 to the reversing mechanism 45 which will cause the motor 44 to drive the worm wheel 42, by means of the worm 43, in a counter clockwise direction as seen from above. This motion will be transmitted by the shaft 41 through the clutch 54 to the disc 61 and will continue until the brush 74 engages the insulation between the segments 67 and 68 at which time the circuit through the motor 44 will be broken. The valve shaft 41 will then come to rest after having been rotated a predetermined amount toward open position.

When the timing device 36 opens the circuit 57—58 after holding it closed for 30 seconds, for example, the clutch 54 will open and release the disc 61 which will then be returned to its mid-position by the centering action of the springs 63—64.

The valve 15 will now have a slightly greater opening and will allow more hot water to pass thru the radiator 18. If this is sufficient to cause the temperature of the room to be increased to 70° F. the contact 92 will be restored to the insulation 94. If, however, the temperature remains low at the next actuation of the timer the same operation will be repeated to open the valve 15 a further amount.

If the temperature in the room should drop to say 68° F. the contact 92 will engage the segment 96 and when the timing device 36 again energizes the circuit 57—58 a circuit will be closed thru the contact 73 to cause the motor 44 to drive the shaft 41 and disc 61 in a counterclockwise direction until the brush 73 has moved onto the insulation. This will rotate the valve shaft 41 a greater amount than if the room temperature were 69° F. and further open the valve 15 to supply more hot water to the radiator 18. When the circuit 57—58 is again opened by the timer the disc 61 will be again centered.

If the temperature of the room drops to say 67° F. the circuit will be closed through the brush 72 and the valve 15 will be further opened.

If the temperature of the room increases above 70° F. the contact 92 will progressively engage the various segments 101—103, which will close a circuit through the other side of the reversing mechanism 45 to cause the motor 44 to rotate the valve stem 41 in a closing direction by different amounts dependent on the increase of temperature. This will close the valve 15 progressively at the timed intervals until the temperature drops to 70°. The thermostatic element 91 may be set to maintain any desired room temperature as indicated by the scale 88.

If the valve stem 41 is rotated in a counter-clockwise direction until the valve 15 is fully open the arm 53 will engage the movable arm 47 and break the contact 83, thus opening the circuit through one side of the reversing mechanism 45 so as to prevent a further drive of the valve shaft 41. In a like manner the arm 51 acts as a limit switch when the valve 15 is fully closed.

This system provides means at predetermined time intervals for checking the temperature of each room and if this temperature is not that called for by the setting of the room thermostat the valve controlling the amount of heat supplied to the radiator of each room will be so adjusted that the temperature of each room will be quickly brought back to normal.

It is seen from the foregoing description that a system is provided which supplies continuously a controlled amount of heat to each room according to the heat requirements of the room as distinguished from the on and off type of control which frequently results in wide temperature fluctuations.

While a heating system is depicted in Fig. 1 the invention may also be applied to a cooling system in which case the boiler 11 may be replaced by a cooler containing brine or other suitable fluid, which is maintained at any desired low temperature by any well known type of cooling device. In this case the connections to the reversing mechanism would be reversed so that if the temperature of the room increased the valve 15 would have to be opened wider to permit more cooling fluid to pass through the radiator 18.

Referring to the embodiment of the invention shown in Fig. 2 a standard type of ventilating and air conditioning system is shown diagrammatically. This system in general comprises a warm air system 105 and a cool air system 106. The warm air system 105 consists of a hot air furnace 107 surrounded by a jacket 108. At the top of the jacket 108 is a duct 109 leading to a humidifier 111 which in turn is connected to the warm air supply duct 112.

The cool air system 106 consists of a cooling unit 113 of well known and standard construction surrounded by a jacket 114. This jacket communicates with a duct 115 which in turn is connected to a dehumidifying device 116 for removing excess moisture from the cool air. The dehumidifier 116 is connected to the cool air supply duct 117.

The warm and cool air systems may be supplied either with fresh air from outdoors through a duct 118 or with recirculated air from indoors through a duct 119 which is connected to openings 120 in the floors of the various rooms to be air conditioned. A damper 121 is provided for mixing the fresh and recirculated air in any desired proportion. Blowers 122 and 123 are located in the warm and cool air supply ducts 124 and 125 for the purpose of continuously circulating the warm and cool air thru the system.

The warm and cool air supply ducts 112 and 117 are connected to a mixing chamber 127 which is provided with a hinged damper 128. This damper is connected to one end of a link 129 the other end of which is pivoted to a gear segment 131 mounted for rotation about the point 132. Meshing with the gear segment 131 is a bevel pinion 133 which is secured to the shaft 41 of the control mechanism 26. This mechanism is connected to the thermostat 31 and to the supply leads 57 and 58 in a similar manner to that described in connection with Fig. 1. The mixing chamber 127 is connected by a duct 134 to an opening 135 near the ceiling of the room 136 which is to be air-conditioned.

Operation of Fig. 2

In the operation of the modified form of the invention shown in Fig. 2 the ducts 112 and 117 are kept continuously supplied with warm and cool air respectively at uniform temperatures and relative humidities in a manner well known in the art. As shown in Fig. 2 the mechanism is in full operation with both warm and cool air being combined in the mixing chamber 127 and passing through the duct 134 and opening 135 into the room 136. The damper 128 is assumed to be open the proper amount to allow sufficient warm and cool air to pass into the room 136 to maintain the temperature of this room at 70° F. At the end of every ten minutes the control mechanism 26 will be activated as described in connection with Fig. 1 to rotate the shaft 41 in one direction or another depending on whether more or less heat is to be supplied to the room 136. If, for example, the thermostat 31 is calling for more heat the shaft 41 will be rotated so as to cause the gear segment 131 to be rotated in a counter-clockwise direction as seen in Fig. 2. This will cause the link 129 to move to the right which in turn will move the damper 128 to the right thus permitting more warm air and less cool air to enter the room 136 which will cause an increase of temperature in the room. If the room 136 is too warm the shaft 41 will be rotated in the opposite direction to cause the gear segment 131 to be rotated in a clockwise direction which by means of the link 129 will move the damper 128 to the left to decrease the supply of warm air and increase the supply of cold air.

The link mechanism 129 et cetera is so designed and proportioned that the motion of the damper 128 is less at the two extremes of its motion than in the middle. That is, when the damper was closed on the hot air side the opening of this damper will be more gradual than it will be when it is in the middle of its motion, and the same way when it is over to the right so as to close off the cold air duct.

Although only a few of the various forms in which this invention may be embodied have been shown herein, it is to be understood that the invention is not limited to any specific construction but may be embodied in various forms without departing from the spirit of the invention as defined by the appended claim.

What is claimed is:

A temperature control system comprising a source of temperature control fluid, a variable valve connected, to control the flow of said fluid, a thermostat responsive to the temperature to be controlled and having contacts arranged to be progressively closed in response to variations of said thermostat from a set value, a reversible motor connected to vary the opening of said valve, a controller having conducting segments and a central insulating segment, brushes connected to said contacts and engaging said conducting segments at various distances from said insulating segment, centering means for said controller, a clutch to drive said controller with said valve, connections including said brushes and contacts to drive said motor in a direction and by an amount dependent upon the selective closing of said contacts, and timed means to render said motor connections operative and simultaneously to engage said clutch intermittently for predetermined periods, whereby said valve opening is altered in accordance with the temperature variations between said periods.

ALBERT D. TRENOR.

REFERENCES CITED

The following references are of record in the file of this patent:

UNITED STATES PATENTS

| Number | Name | Date |
|---|---|---|
| 1,569,994 | Martin | Jan. 19, 1926 |
| 1,690,829 | Mozzocco | Nov. 6, 1928 |
| 1,985,539 | Hartwig | Dec. 25, 1934 |
| 1,987,311 | Poole | Jan. 8, 1935 |
| 1,997,412 | Fischel | Apr. 9, 1935 |
| 2,005,586 | Koci | June 18, 1935 |
| 2,218,454 | Midyette | Oct. 15, 1940 |